United States Patent [19]

Kellenbach

[11] Patent Number: 5,183,126
[45] Date of Patent: Feb. 2, 1993

[54] WEIGHING SYSTEM AND FORCE TRANSMISSION

[76] Inventor: Arthur Kellenbach, 15 Awatea St., St. Ives, Sydney, Australia, 2075

[21] Appl. No.: 762,641
[22] PCT Filed: Mar. 17, 1989
[86] PCT No.: PCT/AU89/00107
    § 371 Date: Nov. 20, 1989
    § 102(e) Date: Nov. 20, 1989
[87] PCT Pub. No.: WO89/08822
    PCT Pub. Date: Sep. 21, 1989

Related U.S. Application Data

[63] Continuation of Ser. No. 445,708, Nov. 20, 1989, abandoned.

[30] Foreign Application Priority Data

Mar. 18, 1988 [AU] Australia .................. P17312
Aug. 18, 1988 [AU] Australia .................. P19967

[51] Int. Cl.$^5$ ........................... G01G 3/14; B32B 7/00
[52] U.S. Cl. .................. 177/211; 177/DIG. 9; 428/120
[58] Field of Search .......... 428/99, 120; 177/211, 177/DIG. 9

[56] References Cited

U.S. PATENT DOCUMENTS

| 3,309,922 | 3/1967 | Green . |
| 3,661,220 | 5/1972 | Harris .................. 177/211 X |
| 3,938,603 | 2/1976 | Shoberg et al. . |
| 4,411,326 | 10/1983 | Siegel . |

FOREIGN PATENT DOCUMENTS

| 112684 | 3/1941 | Australia . |
| 8600700 | 1/1986 | Australia . |
| 1048444 | 1/1959 | Fed. Rep. of Germany . |
| 1808626 | 6/1970 | Fed. Rep. of Germany . |
| 993482 | 10/1951 | France . |
| 2424523 | 11/1979 | France . |
| 661060 | 11/1951 | United Kingdom . |
| 1156026 | 6/1969 | United Kingdom . |

OTHER PUBLICATIONS

Abstract of Japan, M-149, p. 116, Jp, A, 56-155739 (Toukai Gomu Kogyo K.K.) Dec. 2, 1981 (02.12.81) "Manufacturer of Vibration-Proof Rubber With Plate Made of Epoxy Resin Planted With Bolt".
Abstract of Japan, M-92, p. 508, Jp, A, 61-70235 (Hino Motors, Ltd.) Apr. 11, 1986 (11.04.86), "Vibration Isolating Supporter of Engine".

Primary Examiner—George H. Miller, Jr.
Attorney, Agent, or Firm—Beveridge, DeGrandi & Weilacher

[57] ABSTRACT

The weighing device has a bending beam (20,31,41) from which bending moment transmission means (35,36,42,43) extend laterally. Relatively rigid members (24,27,30,32) are coupled to the bending moment transmission means (35,36,42,43) by force transmission elements (13,37,38). Loads applied to the rigid members (24,27,30,32) are measured by a strain gauge (33) mounted on the bending beam (20,31,41). Each force transmission element (13,37,38) comprises a rectangular prismatic body of elastomeric material, such as natural rubber, which may have concave sides (15) to reduce shear forces in the body. Fixing studs (17) may be attached to plates (16) bonded to the upper and lower surfaces of the body. The material of the body is chosen to exhibit creep, hysteresis and linearity characteristics approximating those of an ideal spring.

15 Claims, 6 Drawing Sheets

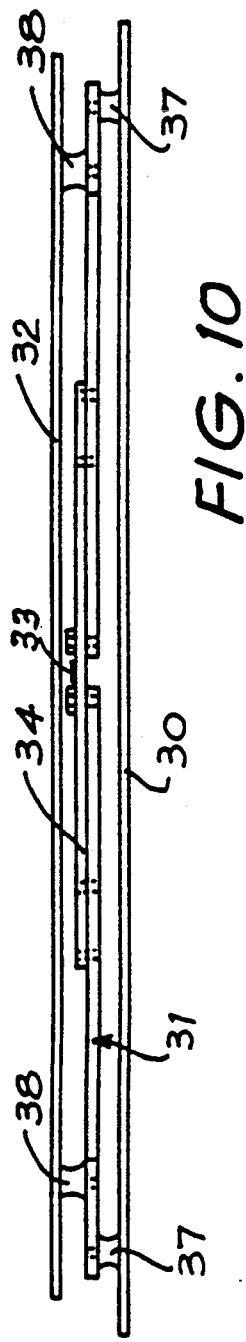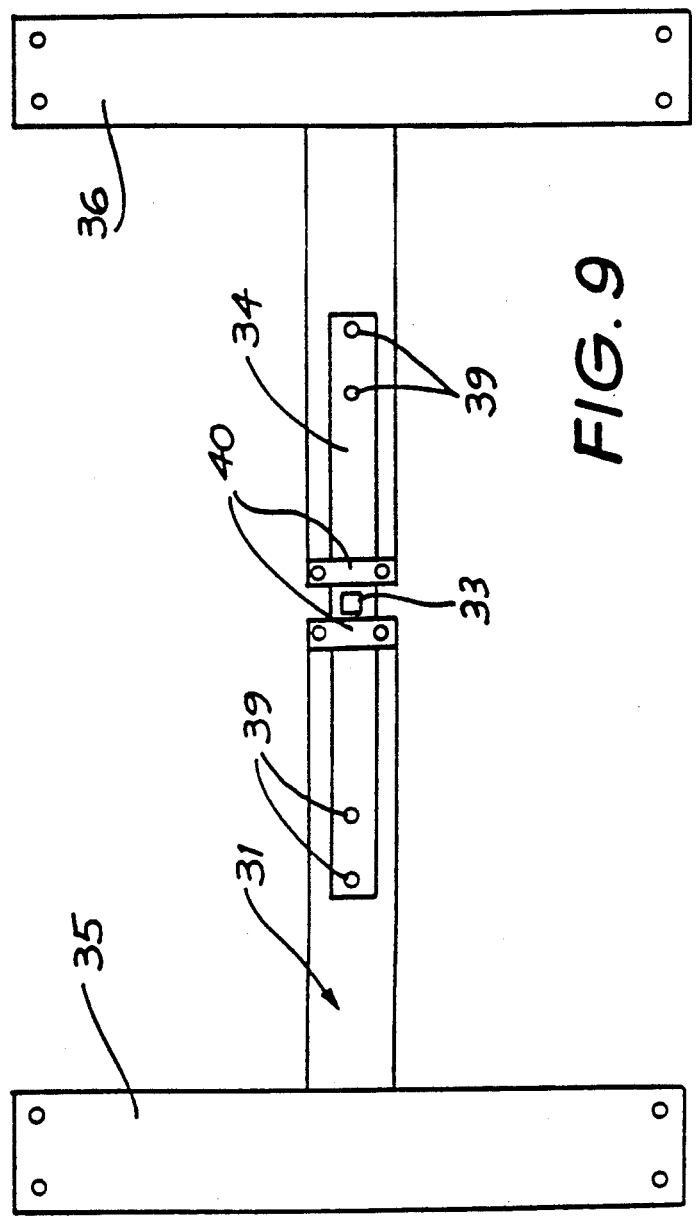

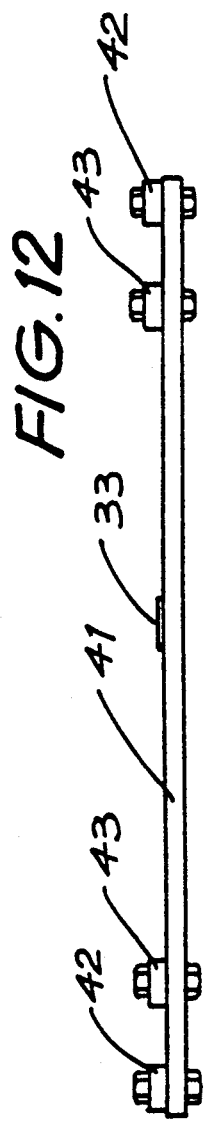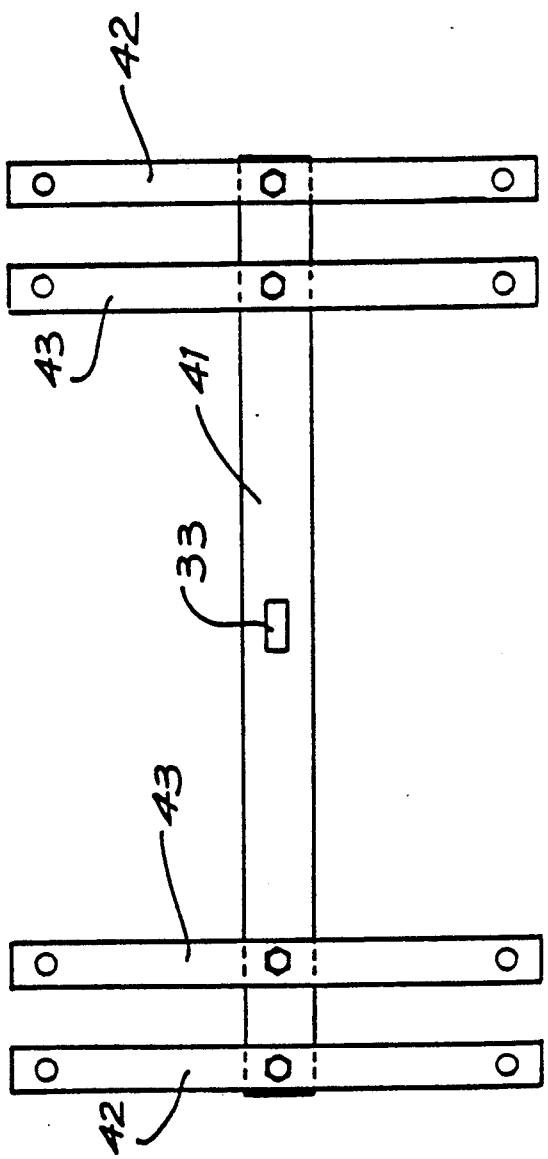

WEIGHING SYSTEM AND FORCE TRANSMISSION

This application is a continuation-in-part, continuation of application Ser. No. 07/445,708, filed Nov. 20, 1989, now abandoned.

FIELD OF THE INVENTION

This invention relates to means for the transfer of forces to a beam in load measurement devices of the single bending beam type. In a single bending beam load measurement device, load and reaction forces are applied to a beam in equilibrium by means of force transmission means spaced from one another in the longitudinal direction of the beam. At a selected region of the beam the strain therein is measured, which arises from the bending of the beam by said forces, this strain being proportional to the distances between the location of the strain measurement region and the force transmission means and between the force transmission means themselves.

In such devices the beam is in use subjected to bending out of its rest plane, such that the alignment of the beam with the original line of application of the forces changes, as does the distance between fixed points on the beam. Such behaviour is to be contrasted with that of the beams which are employed in other devices such as, for example, shear beam load cells and parallelogram beam devices where distortion of the beam does not involve bending along the length thereof. Examples of parallelogram beam devices are described in Laimins U.S. Pat. No. 3,512,595 and Yamato Scale Company Australian Patent Specification No. 535,837.

Single bending beam devices are also subject to other modes of deformation as a result of imperfect loading conditions, and undergo, for example, twisting due to uneven load application and/or uneven support.

BACKGROUND ART

The problem of transferring forces to such single bending beam structure is addressed in Australian Patent Specification 44956/85, and in that specification elastomeric elements are used in two different ways to achieve force transfer to the beam. In one embodiment described in 44956/85, forces are applied to pins which are mounted in elastomeric sleeves within the beam, while in another embodiment, forces are applied to cylindrical elastomeric elements mounted above and below the beam.

SUMMARY OF THE INVENTION

The present invention seeks to provide arrangements which yield improved performance in such bending beam weighing devices, at lower cost. In particular, an object of the invention is to provide means for force transfer which will enable the bending beam to be of simple construction and of cheap material such as spring steel, which will require a minimum of preparation and machining of the beam itself and which will be tolerant of misalignment and the sort of abuse to which weighing devices are often subject in the field, without intolerable loss of performance.

This invention also relates to a weighing system which is particularly although not exclusively, suitable for use in the weighing of small animals, and a further object of the present invention is to provide a weighing system in which a load placed on a load receiving platform or otherwise over an extended area may be weighed with the use of a single strain gauge only, instead of requiring at least two strain gauges as in the prior art.

BRIEF DESCRIPTION OF THE DRAWINGS

FIG. 9 shows a plan view of weighing apparatus according to an embodiment of a second aspect of the invention, with the load receiving platform removed;

FIG. 10 shows the weighing apparatus of FIG. 9 in side elevation;

FIG. 11 shows in plan view a further embodiment of the invention; and

FIG. 12 is a side elevation of the embodiment illustrated in FIG. 11.

Figure 1:
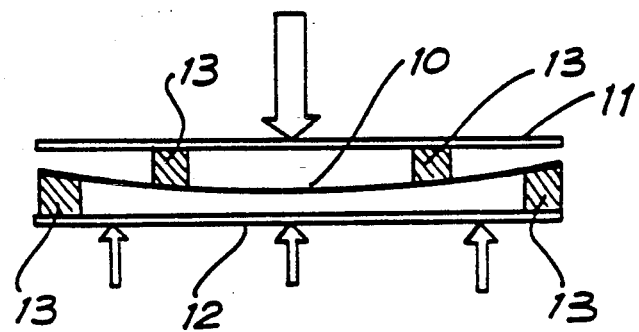
FIG. 1 shows schematically in side elevation, a single bending beam weighing device.

A single bending beam weighing device is illustrated schematically in side elevation in FIG. 1. In this arrangement, the bending beam 10 is coupled to relatively rigid members 11 and 12 by means of force transfer devices 13, the arrangement being such as to allow the beam 10 to bend relative to the members 11 and 12, with the application of a load to one or the other of these members. In the case illustrated, load forces are applied to the member 11, and reaction forces are applied to the member 12 to maintain the system as a whole in equilibrium.

The force transfer means 13 must have the capacity to transmit to the beam 10, the forces which cause its bending, while generating a minimum of resistance to the bending of the beam 10 and a minimum of hysteresis and creep upon distortion, so that the strain in the beam which results from its bending, may accurately be related to the forces applied to it. A typical application of such an arrangement is in weighing devices, where a load or part of a load to be weighed is applied to the member 11.

As load is applied to the member 11, it will stay largely parallel to the surface on which the structure is mounted, while the beam bends so that the point of attachment of the load transfer means to the beam moves in an arc. The devices 13 must therefore be capable of undergoing complex distortions without influencing the bending of the beam 10, and must be capable of accommodating compression, bending, torsion and shear, and must not exhibit nonlinearity, creep or hysteresis to an extent which will destroy the usefulness of the device.

Rubber mountings have been used for a number of years in the application of loads to electronic loadcells, for the purpose of protecting the loadcell from shock loading which is otherwise a major cause of loadcell failure, and to absorb vibrations which which can otherwise lead to fatigue problems.

Such rubber mountings have been used with single point loadcells employing parallelogram beams or shear beams, where the load receiving part of the cell remains parallel to the fixed part of the cell as the load varies. Single bending beam loadcells, on the other hand, are normally subjected to (i) larger deflections in the direction of loading and therefore to greater changes in the distance between the point of reception of the load and the original line of application of the load, (ii) a significant change in the angle between the beam at the region of force application and the load line, as that part of the beam moves in an arc rather than parallel to a direction at right angles to its rest plane.

The use of such rubber mountings with bending beam loadcells therefore leads to levels of inaccuracy which are quite unacceptable.

The invention stems from the realisation that the load transfer means in single bending beam devices must be regarded as an integral part of the the bending beam loadcell, in that the spring characteristics of the transfer means become part of the spring characteristics of the system, and combine to determine the effective characteristics of the system in terms of hysteresis, linearity and creep.

Figure 2:
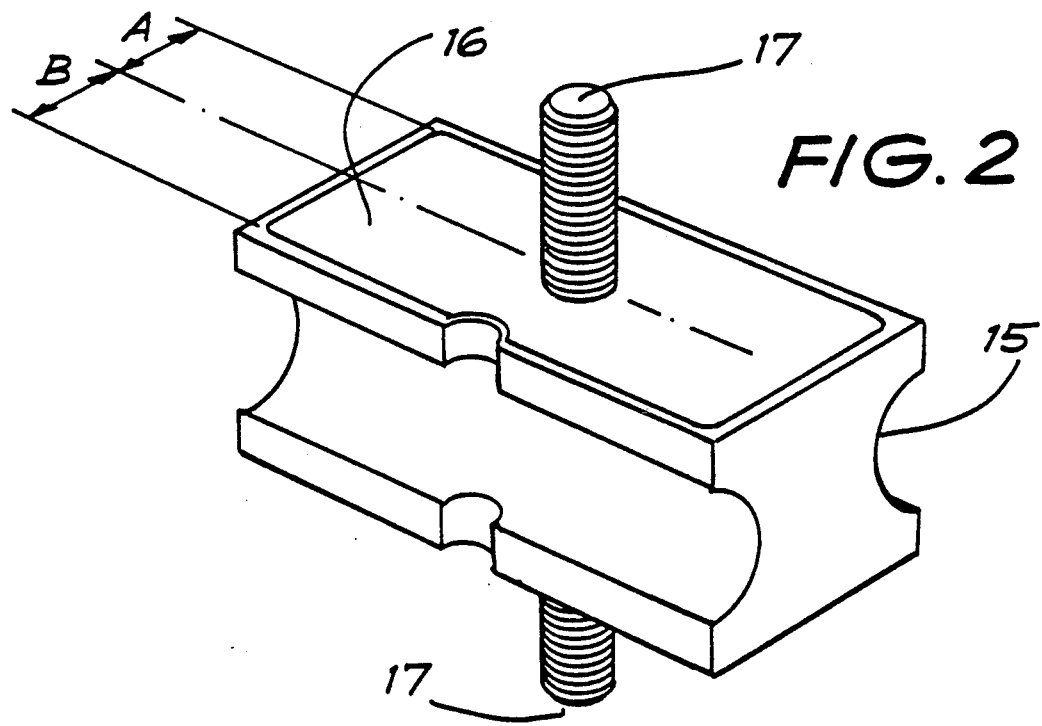
FIG. 2 illustrates a load transfer element incorporating the present invention.

A load transfer element incorporating the present invention is illustrated in FIG. 2, and will there be seen to comprise a body of elastomeric material such as natural rubber or polyurethane, having the shape of a rectangular prism with waisted sides 15. Bonded to each of the upper and lower surfaces of the body is a rectangular steel plate 16, to which is attached by, for example, spot welding, a threaded stud 17. To provide a means for fine adjustment of the device in a manner to be described below, the studs 17 are offset from the true centreline of the body, the distance A shown in FIG. 2 being slightly greater than the distance B. To show the orientation of the body in view of this subtle asymmetry, notches 18 are formed in the plate 16 on the side to which the studs are closest.

Elements of this design are suitable for use in bending beam devices in which the beam comprises a flat strip of spring steel. Typically, the beam will be 40 mm wide and 10 mm thick, and of a spring steel commonly used for such applications as automotive leaf springs and therefore cheap and readily available. For such a beam, transfer elements of natural rubber having a hardness of 60 Duro-A, 60 mm long, 20 mm high and 30 mm wide, with the waisted region 20 mm thick, have been found to give excellent results. We have experimented with elements of various hardnesses (for example by increasing the hardness to 65 Duro-A in order to increase the load capacity) and found that inferior creep and dynamic performance results.

Figure 3:
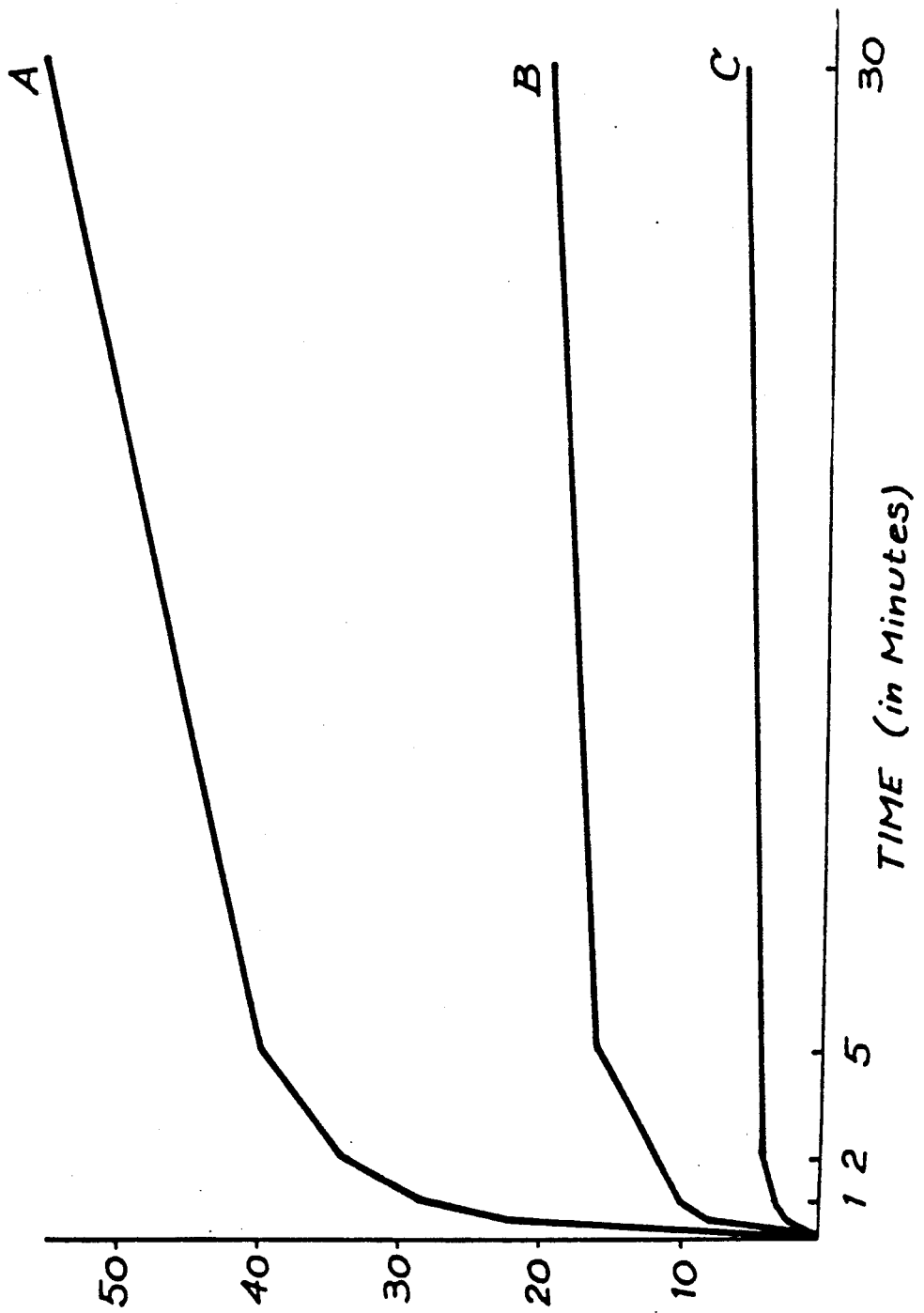
FIG. 3 illustrates the results of a creep test.
Figure 4:
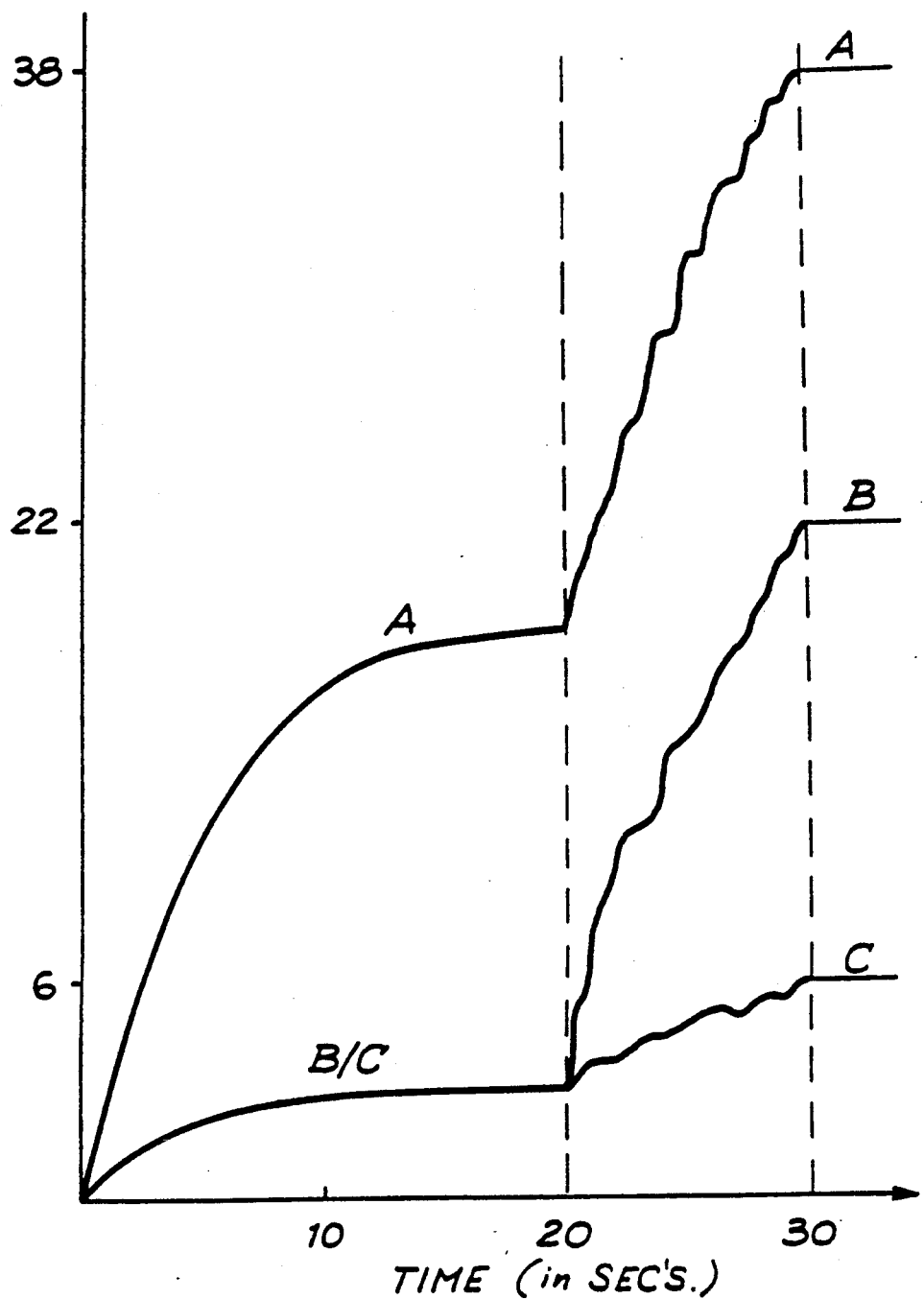
FIG. 4 illustrates the results of a dynamic test.

To illustrate these effects, the graphs of FIGS. 3 and 4 show the creep and dynamic performance of three test elements. Element A was a standard commercially available vibration-isolating mounting, element B was an element having the form described in relation to FIG. 2 and of a modified natural rubber elastomer 65 Duro-A, while element C was of the same shape and dimensions as B but made from natural rubber of hardness 60 Duro-A.

FIG. 3 shows the results of a creep test, which was carried out by installing the mountings on a test frame incorporating a beam of the kind described above, then exercising and stabilising the device. The readings obtained are shown on the vertical axis as counts in 5000 for full scale.

The test load was applied, and the device tared off after 5 seconds. Readings were then taken at the indicated time intervals to 30 minutes, when the load was removed. After a further 5 seconds, the device was tared off again, and readings taken at the same intervals. During relaxation, each of the materials reversed the creep exhibited under load. It will be apparent from FIG. 3 that the beam using element C performed in a very superior fashion, with an error of only 0.12% after 1.5 min. The elements B exhibited more creep, and the commercial element was quite unsatisfactory, with a an error due to creep after 1.5 minutes, of greater than 1%.

In the dynamic test of which the results are shown in FIG. 4, the same three mountings were placed in the test frame, exercised and stabilised. The test load was applied, and after 5 seconds the device was tared off. Readings were then taken up to 20 seconds, and the test frame was subjected to violent shaking for 5 seconds. The reading at the end of this period of dynamics was taken at 30 seconds after the original application of the test load. The results demonstrate the marked superiority of the elements B and C over the known mounting A, and in turn the superiority under dynamic conditions, of the element C.

A consequence of the performance of load transfer elements of the present invention in conjunction with inexpensive steel bars is the ability to make a bending beam weighing machine with a capacity of 1000 kg and an accuracy better than 0.5% of reading, at a maximum manufactured cost of transducers which is less than one quarter of that of the transducers normally used for such applications. Contributing to the success of such elements is the use of waisting of the sides, which firstly enables a reduction in the resistance of the element to bending while maintaining sufficient load-carrying capacity and secondly reduces the extent to which bending of the element produces tearing forces within the elastomer. This shape also facilitates the maintenance of the position of the load line through the element during bending. Another factor in the success of these elements is the choice of elastomer such that the spring characteristics of the element closely approximate those of an ideal spring in terms of freedom from creep, hysteresis and non-linearity. The material found to give the best approximation is natural organic rubber with carbon black reinforcement.

Figure 5:
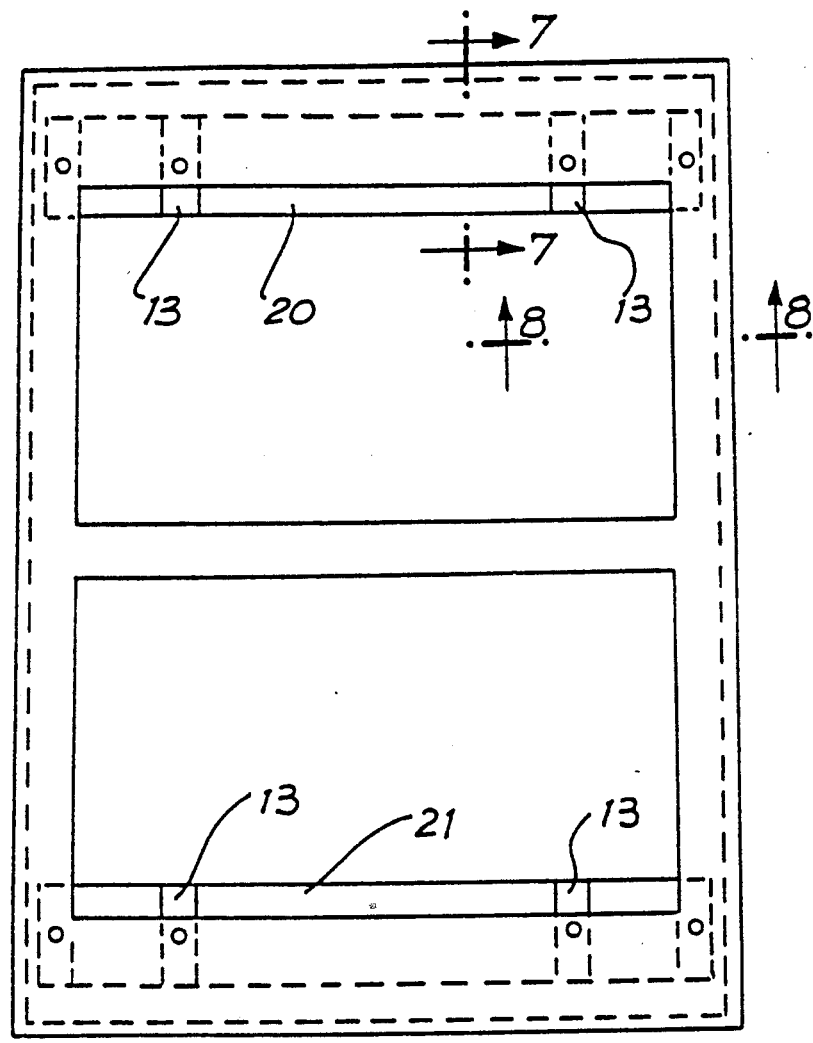
FIG. 5 shows in plan view a bending beam weighing device incorporating load transfer elements of the present invention.
Figure 6:
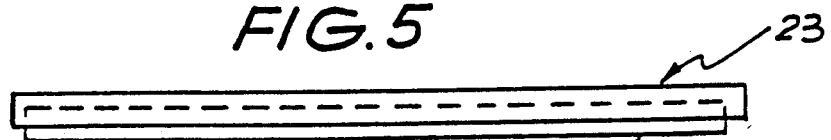
FIG. 6 shows an end elevation of the device of FIG. 5.
Figure 7:
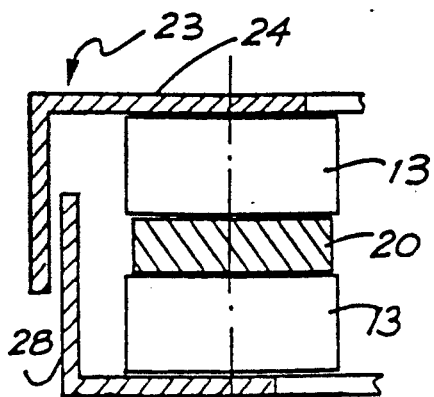
FIG. 7 is a sectional elevation taken on the line 7—7 of FIG. 5.
Figure 8:
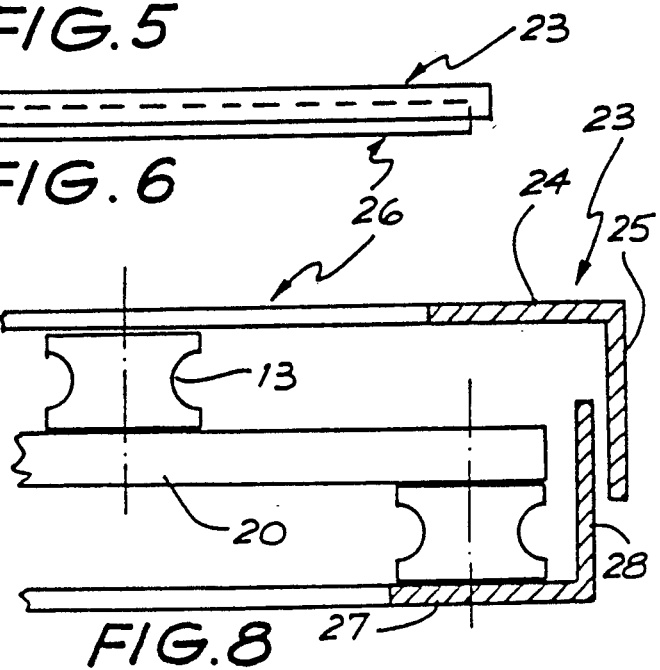
FIG. 8 is a fragmentary sectional elevation taken on the line 8—8 of FIG. 5.

Bending beam weighing devices employing transfer elements of the present invention enable elegant design solutions in weighing equipment, as is exemplified in the weighing platform illustrated in FIGS. 5-7. In this device, a pair of bending beams 20 and 21 consisting of steel bars drilled or punched for the reception of studs 17, are provided with force transfer elements 13 constructed in accordance with FIG. 2. The device further consists of upper frame 23 comprising a horizontal web 24 and a vertical flange 25, and a lower frame 26 comprising a horizontal web 27 and a vertical flange 28, the relative dimensions of the frames being such that the upper flange 25 exteriorly overlaps the lower flange 28 by a distance which is sufficient to enable normal operation, but providing lateral overload protection for the device by limiting lateral movement Each of the bars 20 and 21 is of course provided with a single strain gauge (not shown). Such a weighing frame can be manufactured with great economy.

Because of the offsetting of the studs 17 of the transfer elements 13 described above, rotation of the elements through 180°, provides a fine adjustment of the location of the points of application of force to the beam. This provides a means of calibration or optimisation of the performance of the system, so that the bars 20 and 21 may be manufactured without such fine tolerances as will destroy the economy of the design.

It will be appreciated from the above that the transfer devices of the present invention are not limited to the use of particular materials, but rather the invention characterises the materials of the weighing device in terms of their physical suitability to the purpose, the invention in one sense residing in the discovery that useful results can be obtained with single bending beams from the use of elastomeric load transfer elements of the form described. Generally speaking such elements should have substantially the geometry which has been described, and the elastomer body be of a material the elastic characteristics of which approach those of an ideal spring.

In FIGS. 9 to 12 there are illustrated arrangements suitable for weight measurement of small animals, in the weight range up to the region of 60 or 100 Kg., with an accuracy sufficient for the ordinary requirements of husbandry, and in which only one strain gauge is required.

The apparatus of the embodiment illustrated in FIGS. 9 and 10 comprises a support frame 30, a composite weighing beam 31, and a load receiving platform 32.

The composite beam 31 is designed to operate in a manner similar to the composite beam arrangements described in the abovementioned prior patent application, bending over its entire length, but to utilize a single strain gauge 33 mounted on a weight sensing bar 34, which forms a central portion of a free and floating composite beam 31, the remainder of this assembly consisting of two lateral beam elements 35 and 36, secured for example by welding, to the ends of the central portion of the beam.

The bar 34 is secured to the beams 31 and each of the free ends of the elements 35 and 36 is supported on the support 30 by means of elastomer force transmission elements 37, which are preferably of the kind described above.

Similarly, the load receiving platform 32 is supported on the composite beam structure by force transmission elements 38 of similar construction.

The manner in which the sensing bar 34 is fixed to the beam 31 will be chosen to suit the application in question, but of course must always transmit to the sensing bar, with sufficient accuracy for that application, the bending moment resulting from the load applied to the elements 38 by the load on the platform 32.

In the illustrated example, the sensing bar 34 is fixed to the elements 35 and 36 by means of bolts 39 and straps 40.

As an example of an alternative fixing method, for a portable machine where it is desirable readily to assemble and dissassemble the components, the bar 34 may be held by straps fixed to the elements 35 and 36, and slid from these straps for disassembly. The weight of the elements 35 and 36, and the platform 32 will be found to be sufficient to lock the bar 34 firmly in place when in use with such an arrangement. Naturally if this is preferred, the sensing bar 34 may be constructed integrally with the beam elements 35 and 36, or may permanently be attached thereto, as by welding or adhesive, for example.

It will be appreciated that the effect of the arrangement described will be to transfer to the sensing bar 34, a total bending moment representing the sum of the loads on the eight elements 37 and 38, in a manner similar to that in which the beam of a load measuring device of the kind described above receives a bending moment accurately representative of the applied load, but in this case the load applied to an extended area is reduced to a single beam for strain measurement.

The use of the elastomeric force-transmission elements 37 and 38, produces, as in the prior application, a "floating" strain sensor beam, largely isolated from spurious forces, and this is assisted by the shaping of the elastomer bodies of the elements 37 and 38 as described above.

It will be found that the torsional forces transmitted to the sensing bar by respective arms of the beam elements 35 and 36 are largely cancelled by the resistance presented by the other arms. If desired, the response of the system to such distortions may further be reduced by appropriate design of the strain gauge.

The weighing beam configuration thus described is to be contrasted with configurations in the prior art where loads applied over a region such as a horizontal surface are brought to a single point by means of a system of levers and fulcrums. An example of such a system is that of Williams U.S. Pat. No. 4,315,554. In the apparatus there described, the load on a platform is transmitted by a beam system in which the beams act as simple levers, with the load application point and the force measuring point on opposite sides of a fulcrum. In contrast to such a system, that which is disclosed here provides a beam which accepts bending moments and involves no lever action, being a force sensing system whereby in one single "floating" bending beam bending moments are generated by force transmitting means transmitting forces to the beam and the beam transmitting the bending moments to a point in the beam where a measurement can be taken which represents the sum of the bending moments generated by the forces introduced to the beam through the force transmitting means.

Many variations are possible in the nature and configuration of the means by which the load points represented by the elements 37 and 38 are spaced from the sensing bar 34, other than by the use of U-shaped beam elements 35 and 36. For example, the elements 35 and 36 may be replaced by pairs of separate lateral bars, or by beam elements which extend in a diagonal fashion, between the ends of the sensing bar and the respective pairs of force transmitting elements. In another example, the sensing bar 34 may constitute a region in a continuous plate bearing the elements 37 and 38.

An alternative arrangement is illustrated in FIGS. 11 and 12, where the central portion of the beam 41 is constructed as a single piece, with lateral portions 42 and 43 at each nd, respectively for support on force transmission elements and for the support of a weighing platform by force transmission elements (not shown).

I claim:

1. Bending beam weighing apparatus of the kind in which load and reaction forces are applied to a beam in equilibrium, said forces being applied to respective force transmission means spaced from one another in the longitudinal direction of the beam, and in which is measured at a selected region of the beam the strain therein which arises from the bending of the beam by said forces and which is proportional to the distances between the location of said region and said force transmission means and between said force transmission means, wherein said load forces are applied to said beam by means of force transmission means comprising a body of elastomer, said body being shaped as a rectangular prism, said elastomer being chosen such that in creep, hysteresis and linearity the characteristics of the body closely approximate those of an ideal spring, said body having upper and lower faces, and a pair of opposite side faces which are inwardly waisted between said upper and lower faces.

2. Apparatus according to claim 1 in which said waisted sides lie perpendicular to the longitudinal direction of the beam.

3. Bending beam weighing apparatus of the kind in which load and reaction forces are applied to a beam in equilibrium, said forces being applied to respective force transmission means spaced from one another in the longitudinal direction of the beam, and in which is measured at a selected region of the beam the strain therein which arises from the bending of the beam by said forces and which is proportional to the distances between the location of said region and said force transmission means and between said force transmission means, wherein said reaction forces are applied to said beam by means of force transmission means comprising a body of elastomer, said body being shaped as a rectangular prism, said elastomer being chosen such that in creep, hysteresis and linearity the characteristics of the body closely approximate those of an ideal spring, said body having upper and lower faces, and a pair of opposite side faces which are inwardly waisted between said upper and lower faces.

4. Apparatus according to claim 3, in which said waisted sides lie perpendicular to the longitudinal direction of the beam.

5. Force transmission means for use in bending weighing apparatus of the kind in which load and reaction forces are applied to a beam in equilibrium, said forces being applied to respective force transmission means spaced from one another in the longitudinal direction of the beam, and in which is measured at a selected region of the beam the strain therein which arises from the bending of the beam by said forces and which is proportional to the distances between the location of said region and said force transmission means and between said force transmission means, said force transmission means comprising a body of elastomer, said body being shaped as a rectangular prism which has a top face, a bottom face and side faces, said elastomer being chosen such that in creep, hysteresis and linearity the characteristics of the body closely approximate those of an ideal spring, a pair of opposite side faces of said body being inwardly waisted between said top and bottom faces.

6. Force transmission means according to claim 21 wherein said elastomer is natural rubber.

7. Force transmission means according to claim 21 wherein a rigid plate is bonded to said body at each of its upper and lower faces, fixing means being attached to each of said plates.

8. Force transmission means according to claim 7 wherein said fixing means comprise stud means attached to each plate.

9. Force transmission means according to claim 8 wherein said stud means are coaxial and are offset towards one of the waisted sides of said body from the centreline of said body intersecting said upper and lower faces so that rotation of said body about said stud means through 180 degrees between first and second positions adjusts the location of said body relative to said beam.

10. Bending beam weighing apparatus of the kind in which load and reaction forces are applied to a beam in equilibrium, said forces being applied to respective force transmission means spaced from one another in the longitudinal direction of the beam, and in which is measured at a selected region of the beam the strain therein which arises from the bending of the beam by said forces and which is proportional to the distances between the location of said region and said force transmission means and between said force transmission means, wherein said load and reaction forces are applied to said beam by means of force transmission means comprising a body of elastomer, said body being shaped as a rectangular prism, said elastomer being chosen such that in creep, hysteresis and linearity the characteristics of the body closely approximate those of an ideal spring, said body having upper and lower faces, and a pair of opposite side faces which are inwardly waisted between said upper and lower faces.

11. Apparatus according to claim 10 wherein said elastomer is natural rubber.

12. Apparatus according to claim 10 wherein rigid plates are bonded to said body at its upper and lower faces, and fixing means are attached to each to said plates.

13. Apparatus according to claim 12 wherein said fixing means comprise stud means attached to each plate.

14. Apparatus according to claim 10 wherein said stud means are coaxial and are offset towards one of the waisted side faces of said body from the centreline of said body intersecting said upper and lower faces so that rotation of said body about said stud means through 180 degrees between first and second positions adjusts the location of said body relative to said beam.

15. Apparatus according to claim 10 in which said waisted sides lie perpendicular to the longitudinal direction of the beam.

* * * * *